(12) United States Patent
Ushijima

(10) Patent No.: US 6,378,078 B1
(45) Date of Patent: Apr. 23, 2002

(54) SEMICONDUCTOR INTEGRATED CIRCUIT SUPERVISING AN ILLICIT ADDRESS OPERATION

(75) Inventor: Mitsuru Ushijima, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/271,364

(22) Filed: Mar. 18, 1999

(30) Foreign Application Priority Data

Mar. 24, 1998 (JP) ............................................ 10-075519

(51) Int. Cl.[7] ................................................ G06F 11/00
(52) U.S. Cl. ........................................ 713/400; 714/42
(58) Field of Search ............................ 713/400; 710/3, 710/4; 711/201; 714/30, 42, 47–53, 743

(56) References Cited

U.S. PATENT DOCUMENTS

| 5,014,311 A | 5/1991 | Schrenk |
| 5,060,188 A | * 10/1991 | Zulian et al. ................... 711/5 |
| 5,687,354 A | 11/1997 | Koo |
| 5,848,258 A | * 12/1998 | Fenwick et al. ................ 711/5 |

FOREIGN PATENT DOCUMENTS

| EP | 0 658 847 | 6/1995 |
| JP | 4-106637 | 4/1992 |
| JP | 5-87880 | 4/1993 |
| JP | 6-290040 | 10/1994 |

* cited by examiner

Primary Examiner—Thomas M. Heckler
(74) Attorney, Agent, or Firm—Sughrue Mion, PLLC

(57) ABSTRACT

A supervisory circuit for a semiconductor integrated circuit includes a first circuit, a second circuit, inverters, and an EXOR circuit. The first circuit outputs an address signal. The second circuit receives via an address bus the address signal transferred from the first circuit. The inverters hold at least an address signal preceding one transfer period as a past address signal on the address bus. The EXOR circuit compares the past address signal held by the inverters with a current address signal on the address bus, and when the comparison result represents that the past and current address signals are identical, outputs an illicit operation detection signal.

9 Claims, 5 Drawing Sheets

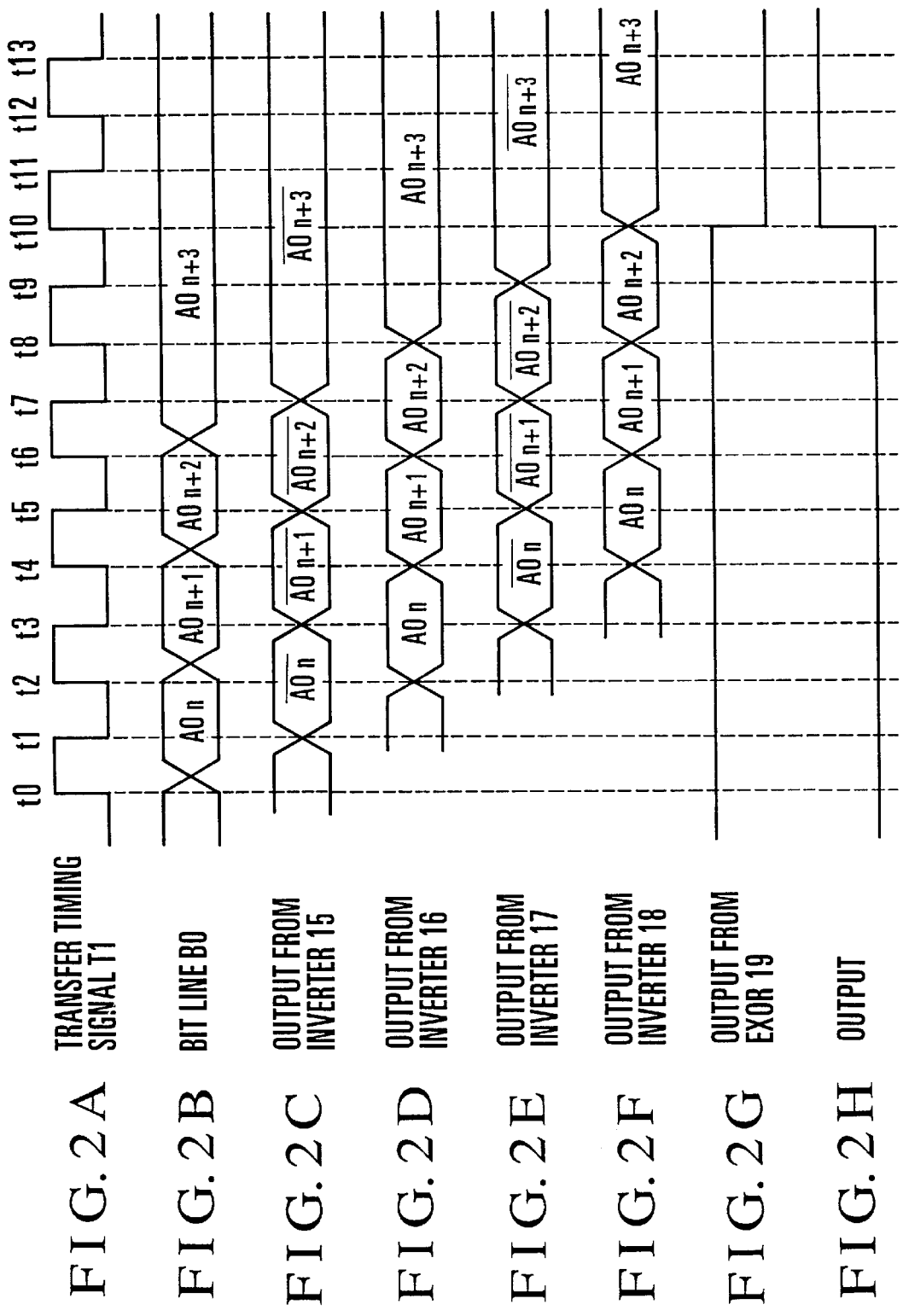

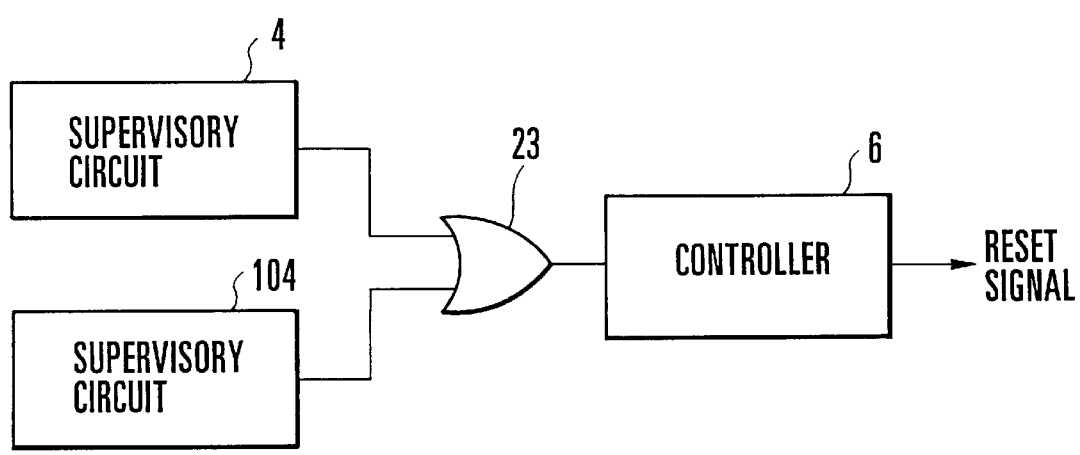
F I G. 5

SEMICONDUCTOR INTEGRATED CIRCUIT SUPERVISING AN ILLICIT ADDRESS OPERATION

BACKGROUND OF THE INVENTION

The present invention relates to a supervisory circuit for supervising an illicit address operation on a semiconductor integrated circuit and, more particularly, to an illicit address operation supervisory circuit for a microcomputer having an address bus line for memory addressing.

Conventionally, a microcomputer integrated on a semiconductor substrate designates (addressing) by a program counter a location on a ROM (Read Only Memory) where a program to be executed is stored, and reads out data from the ROM.

In the conventional microcomputer, the program counter outputs an address designating a location on the ROM to an address bus line between the program counter and ROM. If, therefore, a signal is supplied to the address bus between the program counter and ROM by bringing a probe or the like into contact with the address bus, the address flowing through the address bus line can be illicitly rewritten. The conventional microcomputer does not have any means for detecting such illicit address operation.

The conventional microcomputer suffers a security problem of undesirably allowing an illicit address operation for access to the ROM so as to execute a specific program stored in the ROM or read out data from the ROM.

SUMMARY OF THE INVENTION

It is an object of the present invention to provide a supervisory circuit for a semiconductor integrated circuit capable of realizing security with respect to an illicit address operation.

To achieve the above object, according to the present invention, there is provided a supervisory circuit for a semiconductor integrated circuit, comprising a first circuit for outputting an address signal, a second circuit for receiving via an address bus the address signal transferred from the first circuit, holding means for holding at least an address signal preceding one transfer period as a past address signal on the address bus, and first comparison means for comparing the past address signal held by the holding means with a current address signal on the address bus, and when a comparison result represents that the past and current address signals are identical, outputting an illicit operation detection signal.

BRIEF DESCRIPTION OF THE DRAWINGS

FIGS. 2A to 2H are timing charts for explaining operation of the supervisory circuit shown in FIG. 1B;

FIG. 5 is a block diagram showing a combination of the supervisory circuits shown in FIGS. 1B and 3.

DESCRIPTION OF THE PREFERRED EMBODIMENTS

The present invention will be described in detail below with reference to the accompanying drawings.

[First Embodiment]

Figure 1A:
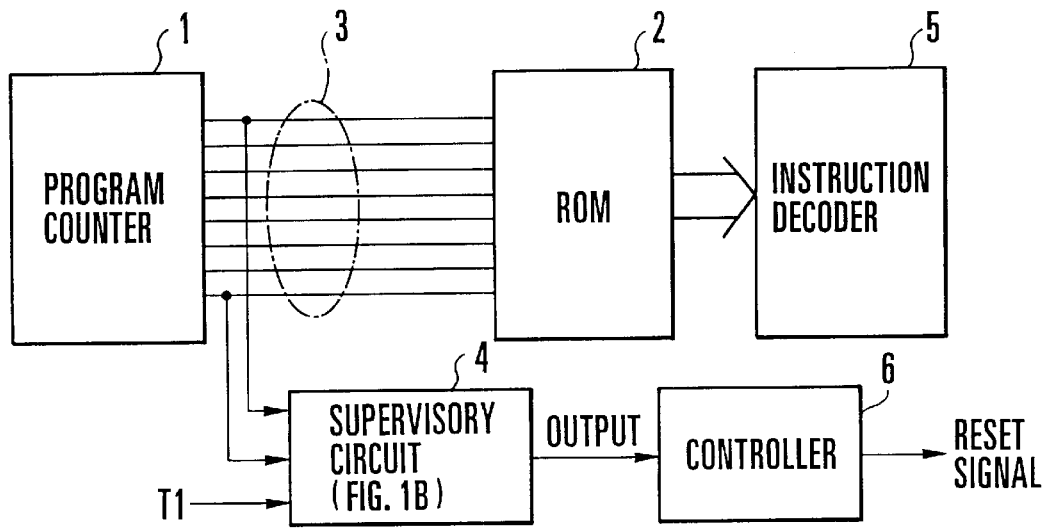
FIG. 1A is a block diagram showing the main part of a microcomputer according to the first embodiment of the present invention.

FIG. 1A shows the main part of a microcomputer according to the first embodiment of the present invention.

The microcomputer of this embodiment comprises a program counter 1 for outputting address data, a ROM 2 which stores instruction data to be executed and is accessed using address data from the program counter 1, an address bus 3 which connects the program counter 1 and ROM 2, a supervisory circuit 4 for supervising address data on the address bus 3, an instruction decoder 5 for decoding instruction data read out from the ROM 2, and a controller 6 for outputting a reset signal upon reception of an abnormality detection signal from the supervisory circuit 4.

In the microcomputer having this arrangement, instruction data are sequentially read out from the ROM 2, decoded, and executed. The program counter 1 outputs to the address bus 3 8-bit parallel address data representing a location on the ROM 2 where instruction data to be executed is stored. For example, to designate an address "2F (hexadecimal)" on the ROM 2, the program counter 1 outputs address data "00101111" to the address bus 3. The ROM 2 reads out data stored at the location designated by the address data from the program counter 1 to the instruction decoder 5, and the instruction decoder 5 decodes the data from the ROM 2.

The supervisory circuit 4 supervises the address data flowing through the address bus 3, and outputs an abnormality detection signal OUTPUT. The controller 6 receives the abnormality detection signal from the supervisory circuit 4, and outputs a reset signal.

Figure 1B:
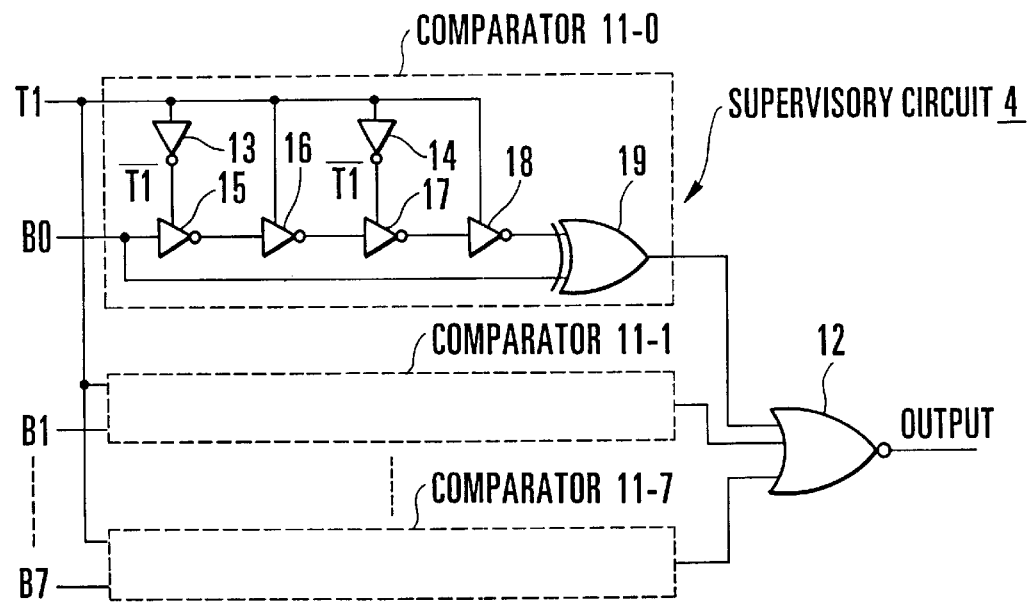
FIG. 1B is a circuit diagram showing the detailed arrangement of a supervisory circuit shown in FIG. 1A.

FIG. 1B shows the detailed arrangement of the supervisory circuit 4. In FIG. 1B, the supervisory circuit 4 is constituted by eight comparators 11-0 to 11-7 arranged in correspondence with bit lines (signals) B0 to B7 of the address bus 3, and a NOR circuit 12 for NORing outputs from the comparators 11-0 to 11-7.

Each of the comparators 11-0 to 11-7 comprises inverters 13 and 14 for inverting a transfer timing signal T1 of the address bus 3, an inverter 15 having a signal input connected to a corresponding one of the bit lines B0 to B7 of the address bus 3 and a control input connected to the output of the inverter 13, an inverter 16 having an input connected to the output of the inverter 15 and a control input receiving the transfer timing signal T1, an inverter 17 having an input connected to the output of the inverter 16 and a control input connected to the output of the inverter 14, an inverter 18 having an input connected to the output of the inverter 17 and a control input receiving the transfer timing signal T1, and an EXOR circuit 19 which has one input connected to a corresponding one of the bit lines B0 to B7 of the address bus 3 and the other input connected to the output of the inverter 18, and EXORs the two inputs.

The inverters 13 to 18 constitute a holding means for holding a past address signal having been transferred through the address bus 3, and the EXOR circuit 19 constitutes a comparison means for comparing the past address signal with a current address signal on the address bus 3.

Since the control input of the inverter 15 receives an inverted signal $\overline{T1}$ of the transfer timing signal T1 via the inverter 13, the inverter 15 changes to an enable state when the transfer timing signal T1 is at "L" level, and to a disable state when the signal T1 is at "H" level. The inverter 17 similarly changes to enable and disable states.

Since the control input of the inverter 16 receives the transfer timing signal T1, the inverter 16 changes to an enable state when the transfer timing signal T1 is at "H" level, and to a disable state when the signal T1 is at "L" level. The inverter 18 similarly changes to enable and disable states.

Normal operation when no illicit address operation is performed for the address bus 3 will be explained with reference to FIGS. 2A to 2H. Address data flowing through the address bus 3 changes in synchronism with the transfer timing signal T1 shown in FIG. 2A. In FIGS. 2C to 2H, the bit line B0 of the address bus 3 shown in FIG. 2B is exemplified.

If the transfer timing signal T1 changes to "L" at time t1, the inverter 15 changes to an enable state to invert a signal $A0_n$ on the bit line B0 of the address bus 3 and output a signal $\overline{A0_n}$ (FIG. 2C). If the transfer timing signal T1 changes to "H" at time t2, the inverter 16 changes to an enable state to invert the output $\overline{A0_n}$ from the inverter 15 and output the signal $A0_n$ (FIG. 2D).

If the transfer timing signal T1 changes to "L" at time t3, the inverter 17 changes to an enable state to invert the output $A0_n$ from the inverter 16 and output the signal $\overline{A0_n}$ (FIG. 2E). If the transfer timing signal T1 changes to "H" at time t4, the inverter 18 changes to an enable state to invert the output $\overline{A0_n}$ from the inverter 17 and output the signal $A0_n$ (FIG. 2F)

Since a signal on the bit line B0 of the address bus 3 at time t4 is $A0_{n+1}$, the EXOR circuit 19 receives the signal $A0_n$ at one input and the signal $A0_{n+1}$ at the other input. These signals have different values, and thus the EXOR circuit 19 outputs an "H"-level signal (FIG. 2G).

As a result, the comparator 11-0 outputs the "H"-level signal. The same operation is performed in the comparators 11-1 to 11-7, and the comparators 11-1 to 11-7 output "H"-level signals. The abnormality detection signal OUTPUT as an output from the NOR circuit 12 is at "L" level (FIG. 2H) to represent no address abnormality on the address bus 3.

Operation when an illicit address operation is performed for the address bus 3 will be explained. When an illicit address operation is performed, each bit value of the address bus 3 does not change in synchronism with the transfer timing signal T1, and keeps the same value for a longer time than the period of the signal T1. More specifically, if an illicit address operation is performed at time t6, as shown in FIG. 2B, the signal on the bit line B0 of the address bus 3 is fixed to $A0_{n+3}$.

The output from the inverter 18 at time t10 changes to $A0_{n+3}$ (FIG. 2F). Since the signal on the bit line B0 of the address bus 3 is also $A0_{n+3}$ (FIG. 2B), the EXOR circuit 19 outputs an "L"-level signal (FIG. 2G).

The same operation is performed in the comparators 11-1 to 11-7, and the comparators 11-1 to 11-7 output "L"-level signals. Consequently, the abnormality detection signal OUTPUT as an output from the NOR circuit 12 changes to "H" level (FIG. 2H) to represent an address abnormality on the address bus 3.

The "H"-level abnormality detection signal OUTPUT from the supervisory circuit 4 is output to a controller (not shown) to reset the semiconductor integrated circuit similarly to reception of an external reset signal.

According to the first embodiment, a past address signal transferred through the address bus 3 is compared with a current address signal on the address bus 3, and when the two address signals are identical, an abnormality is determined to output an "H"-level abnormality detection signal OUTPUT. Then, the semiconductor integrated circuit is reset. Even if an illicit address operation is performed for the address bus 3, no access to the ROM 2 can be permitted to realize a security function with respect to an illicit address operation.

In the first embodiment, an address preceding one transfer period is held as a past address signal transferred through the address bus 3. However, the present invention is not limited to this, and address signals over a plurality of transfer periods including a signal preceding one transfer period (e.g., two address signals preceding two transfer periods and preceding one transfer period) may be successively held.

[Second Embodiment]

Figure 3:
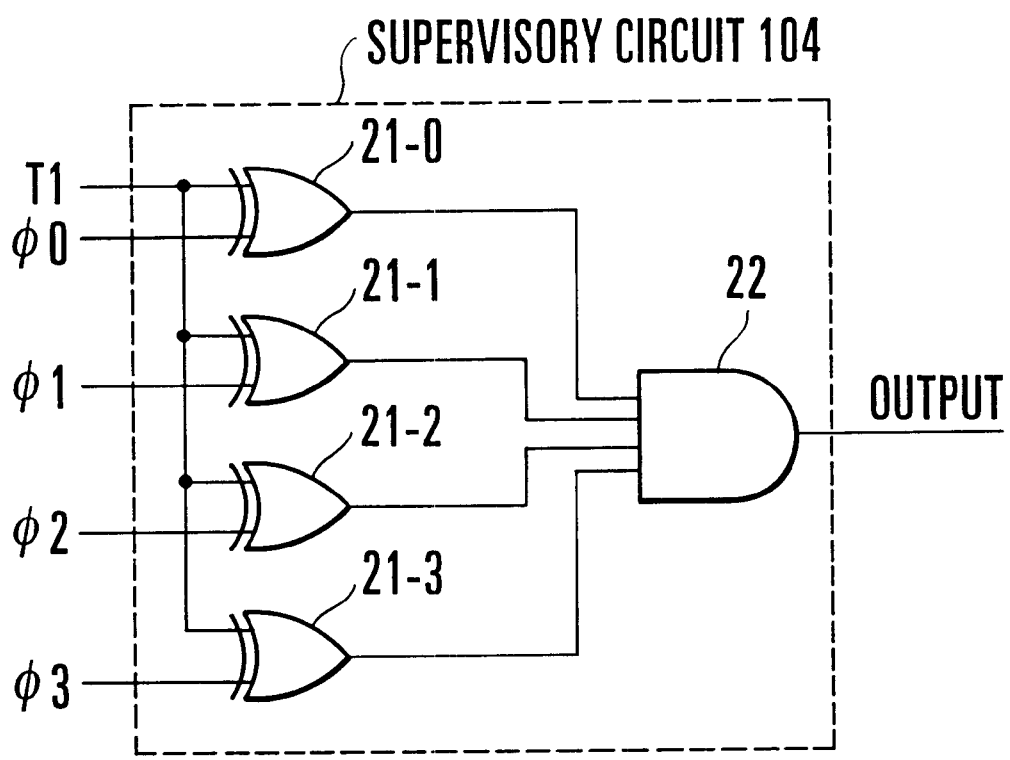
FIG. 3 is a circuit diagram showing the detailed arrangement of a supervisory circuit according to the second embodiment of the present invention.

FIG. 3 shows a supervisory circuit according to the second embodiment of the present invention. FIGS. 4A to 4J show operation of the supervisory circuit shown in FIG. 3.

In FIG. 3, a supervisory circuit 104 of this embodiment comprises EXOR circuits 21-0 to 21-3 each for EXORing the transfer timing signal T1 and a clock signal $\phi 0$, $\phi 1$, $\phi 2$, or $\phi 3$, and an AND circuit 22 for ANDing outputs from the EXOR circuits 21-0 to 21-3. With this arrangement, the supervisory circuit 104 compares the transfer timing signal T1 with the clock signals $\phi 0$, $\phi 1$, $\phi 2$, and $\phi 3$ for generating the transfer timing signal T1.

Figure 4:
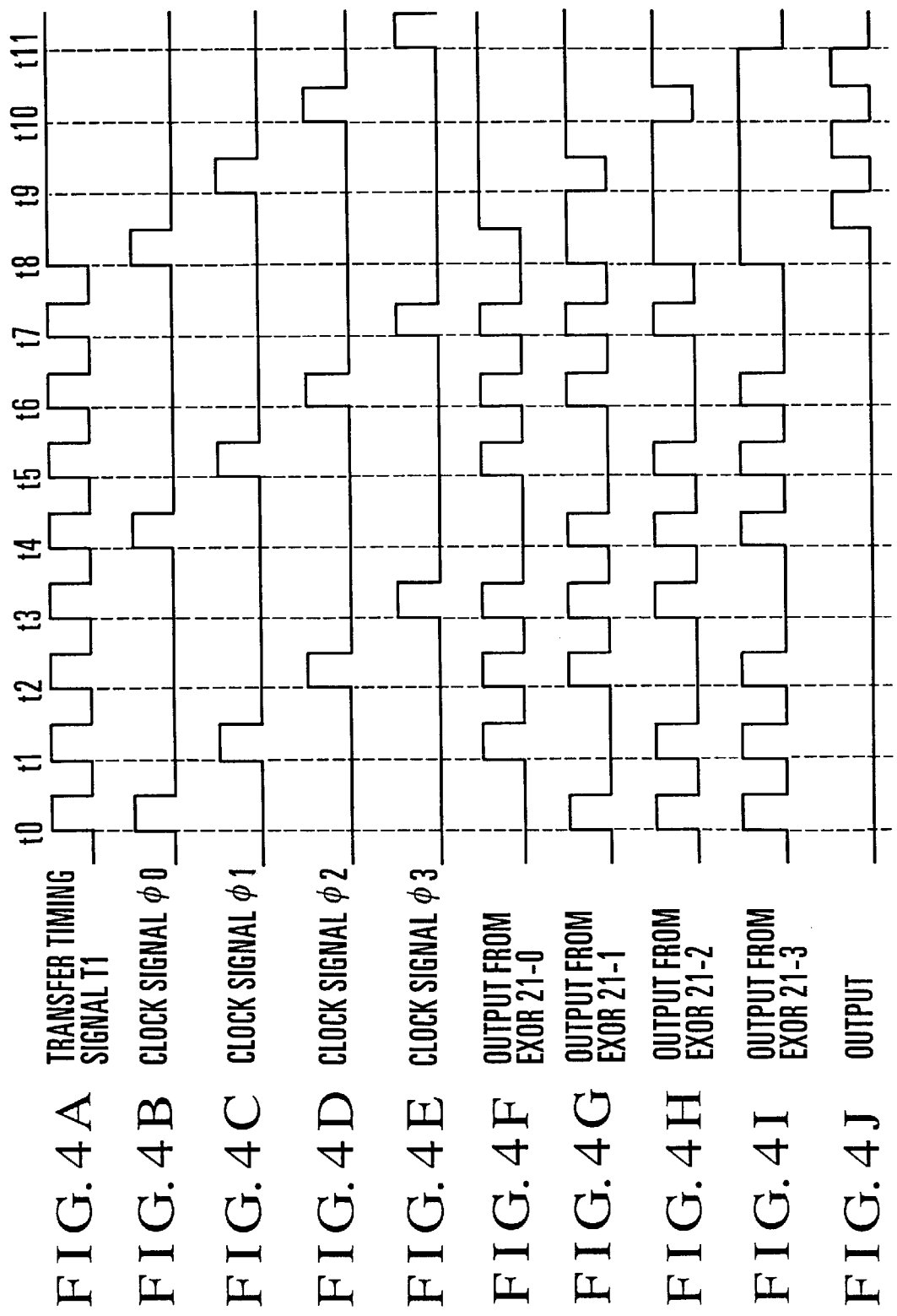
FIGS. 4A to 4J are timing charts for explaining operation of the supervisory circuit shown in FIG. 3.

The transfer timing signal T1 shown in FIG. 4A is generated from the clock signals $\phi 0$, $\phi 1$, $\phi 2$, and $\phi 3$ shown in FIGS. 4B to 4E. The EXOR circuit 21-0 EXORs the transfer timing signal T1 and the clock signal $\phi 0$. Similarly, the EXOR circuits 21-1, 21-2, and 21-3 respectively EXOR the transfer timing signal T1 and the clock signals $\phi 1$, $\phi 2$, and $\phi 3$.

When the transfer timing signal T1 and the clock signals $\phi 1$, $\phi 2$, and $\phi 3$ synchronize each other, like at time t0 to time t7, outputs from all the EXOR circuits 21-0 to 21-3 do not simultaneously change to "H" level (FIGS. 4F to 4I). Therefore, the abnormality detection signal OUTPUT as an output from the AND circuit 22 is at "L" level (FIG. 4J) to represent no abnormality of the transfer timing signal T1.

Operation when an illicit signal is supplied to the transfer timing signal T1 will be explained. Since a signal longer than the original period is supplied at time t8, the transfer timing signal T1 is fixed to "H" level (FIG. 4A). When an illicit transfer timing operation is performed, synchronization between the transfer timing signal T1 and the clock signals $\phi 1$, $\phi 2$, and $\phi 3$ is lost.

Since outputs from the EXOR circuits 21-0 to 21-3 simultaneously change to "H" level (FIGS. 4F to 4I) after time t8, the AND circuit 22 outputs an "H"-level abnormality detection signal OUTPUT (FIG. 4J) to represent an abnormality of the transfer timing signal T1.

If an illicit address is supplied to the address bus 3 (FIG. 1A) while illicitly greatly prolonging the period of the transfer timing signal T1 after time t8, the supervisory circuit 4 in FIG. 1B cannot detect any illicit address operation unless one period of the transfer timing signal T1 completes. That is, prolonging the period of the transfer timing signal T1 undesirably allows access to the ROM 2 before the lapse of the period of the transfer timing signal T1.

To prevent this illicit access, as shown in FIG. 5, the supervisory circuits 4 and 104 in FIGS. 1B and 3 can be combined to reset the microcomputer upon detection of an illicit operation to the transfer timing signal T1, thereby preventing an illicit access to the ROM 2. Reference numeral 23 denotes an OR circuit for outputting an OR signal of abnormality detection outputs from the supervisory circuits 4 and 104 to the controller 6.

Note that the supervisory circuit 104 in FIG. 3 may not be combined with the supervisory circuit 4 in FIG. 1A but used singly in order to detect only an illicit transfer timing signal operation.

As has been described above, according to the present invention, a past address can be held by the holding means and compared with a current address on the address bus by the comparison means, thereby detecting an illicit address operation. As a result, a security function with respect to an illicit address operation can be realized.

In addition, the transfer timing signal and the clock signal for generating the transfer timing signal can be compared by the comparison means to detect an illicit transfer timing operation.

Further, an illicit transfer timing can be detected at the same time as an illicit address operation, thereby realizing a more reliable security function with respect to an illicit address operation.

What is claimed is:

1. A semiconductor integrated circuit supervising an illicit address operation, comprising:

a first circuit for outputting an address signal;

a second circuit for receiving via an address bus the address signal transferred from said first circuit;

holding means for holding at least an address signal preceding one transfer period as a past address signal on the address bus;

first comparison means for comparing the past address signal held by said holding means with a current address signal on the address bus, and when a comparison result represents that the past and current address signals are identical, outputting an illicit operation detection signal;

wherein said first circuit comprises a program counter for outputting a counter value as an address signal;

said second circuit comprises a program memory in which a program is stored at a predetermined address;

said holding means comprises a plurality of inverter groups which are arranged in correspondence with bit signals for forming an address signal, and receive the bit signals and a transfer timing signal representing a transfer timing; and said first comparison means comprises a plurality of EXOR circuits which are arranged in correspondence with the bit signals for forming an address signal, and output EXOR signals of outputs from the inverter groups and the bit signals.

2. A circuit according to claim 1, further comprising an OR circuit for outputting an OR signal of outputs from the EXOR circuits as an illicit operation detection signal.

3. A circuit according to claim 1, wherein each of the inverter groups comprises first to sixth inverters, the first and second inverters invert a transfer timing signal;

the third inverter receives a bit signal at an input and an output from the first inverter at a control input, the fourth inverter receives an output from the third inverter at an input and the transfer timing signal at a control input, the fifth inverter receives an output from the fourth inverter at an input and an output from the second inverter at a control input, the sixth inverter receives an output from the fifth inverter at an input and the transfer timing signal at a control input, and each of the EXOR circuits receives an output from the sixth inverter and the bit signal.

4. A semiconductor integrated circuit supervising an illicit address operation, comprising:

a first circuit for outputting an address signal;

a second circuit for receiving via an address bus the address signal transferred from said first circuit;

holding means for holding at least an address signal preceding one transfer period as a past address signal on the address bus;

first comparison means for comparing the past address signal held by said holding means with a current address signal on the address bus, and when a comparison result represents that the past and current address signals are identical, outputting an illicit operation detection signal;

wherein said first circuit comprises a program counter for outputting a counter value as an address signal;

said second circuit comprises a program memory in which a program is stored at a predetermined address; and further comprising second comparison means for comparing a transfer timing signal representing a timing of transferring the address signal from said first circuit to said second circuit with a clock signal for generating the transfer timing signal, and when a comparison result represents asynchronization of the two signals, outputting an illicit operation detection signal.

5. A circuit according to claim 4, wherein said second comparison means comprises a plurality of EXOR circuits which are arranged in correspondence with bit signals for forming an address signal, and output EXOR signals of the transfer timing signal representing the transfer timing and the bit signals.

6. A circuit according to claim 5, further comprising an AND circuit for ANDing outputs from the EXOR circuits and outputting an illicit operation detection signal.

7. A supervisory circuit for a semiconductor integrated circuit, comprising:

a first circuit for outputting an address signal;

a second circuit for receiving via an address bus the address signal output from said first circuit; and comparison means for comparing a transfer timing signal representing a timing of transferring the address signal from said first circuit to said second circuit with a clock signal for generating the transfer timing signal, and when a comparison result represents asynchronization of the two signals, outputting an illicit operation detection signal.

8. A circuit according to claim 7, wherein said second comparison mean comprises a plurality of EXOR circuits which are arranged in correspondence with bit signals for forming an address signal, and output EXOR signals of the transfer timing signal representing the transfer timing and the bit signals.

9. A circuit according to claim 8, further comprising an AND circuit for outputting an AND signal of outputs from the EXOR circuits as an illicit operation detection signal.

* * * * *